United States Patent [19]

Thompson

[11] 3,949,902
[45] Apr. 13, 1976

[54] PORTABLE DISPENSING BAR

[76] Inventor: Frank B. Thompson, 719 Tammy Drive, San Antonio, Tex. 78216

[22] Filed: June 11, 1973

[21] Appl. No.: 369,111

[52] U.S. Cl. .............. 222/129.1; 222/176; 296/22; 312/140.1; 312/229; 312/249
[51] Int. Cl.² ............................................ A47J 31/40
[58] Field of Search ........ 222/108, 129.1, 131, 136, 222/176, 185, 178, 132, 135, 146 C; 312/229, 249, 278, 279, 236, 327, 328, 250, 335, 270, 140.1, 140.2, 209, 330; D6/144; D94/3 A; D12/27; 188/21; 296/22; 62/382

[56] References Cited
UNITED STATES PATENTS

| | | | |
|---|---|---|---|
| 183,949 | 11/1958 | Skaller | D94/3 A |
| 192,114 | 1/1962 | Broshan | D12/27 |
| 1,063,878 | 6/1913 | Hart | 188/21 |
| 2,257,374 | 9/1941 | Fritz | 312/335 X |
| 2,863,708 | 12/1958 | Cahn | 312/279 X |
| 3,089,618 | 5/1963 | Forsyth | 222/66 X |
| 3,157,446 | 11/1964 | Stark | 312/328 |
| 3,195,779 | 7/1965 | Nicko | 272/146 C |
| 3,232,489 | 2/1966 | Buffington | 222/108 |
| 3,539,240 | 11/1970 | Lorenzo | 312/335 |
| 3,647,118 | 3/1972 | Johnson | 222/185 |
| 3,677,173 | 7/1972 | Fogle et al. | 222/146 R |
| 3,735,898 | 5/1973 | Smith | D12/22 X |
| 3,748,437 | 7/1973 | Keeshin | 312/228 |

*Primary Examiner*—Robert B. Reeves
*Assistant Examiner*—Larry Martin
*Attorney, Agent, or Firm*—Cox, Smith, Smith, Hale & Guenther Incorporated

[57] ABSTRACT

A portable bar assembly characterized by a unitary cabinet structure mounted on casters and containing a plurality of electrically operated liquid dispensing units mounted therein for selectively delivering a controlled quantity of liquid from liquid containers mounted in a drawer assembly slidably located inside the cabinet. The cabinet structure is provided with a surface storage area containing an ice sink and utility pans. A glass dispenser and refuse receptacle are located on the front of the cabinet structure. A brake assembly is provided for locking the casters against movement. Power for the dispensing units is provided by a battery pack.

8 Claims, 4 Drawing Figures

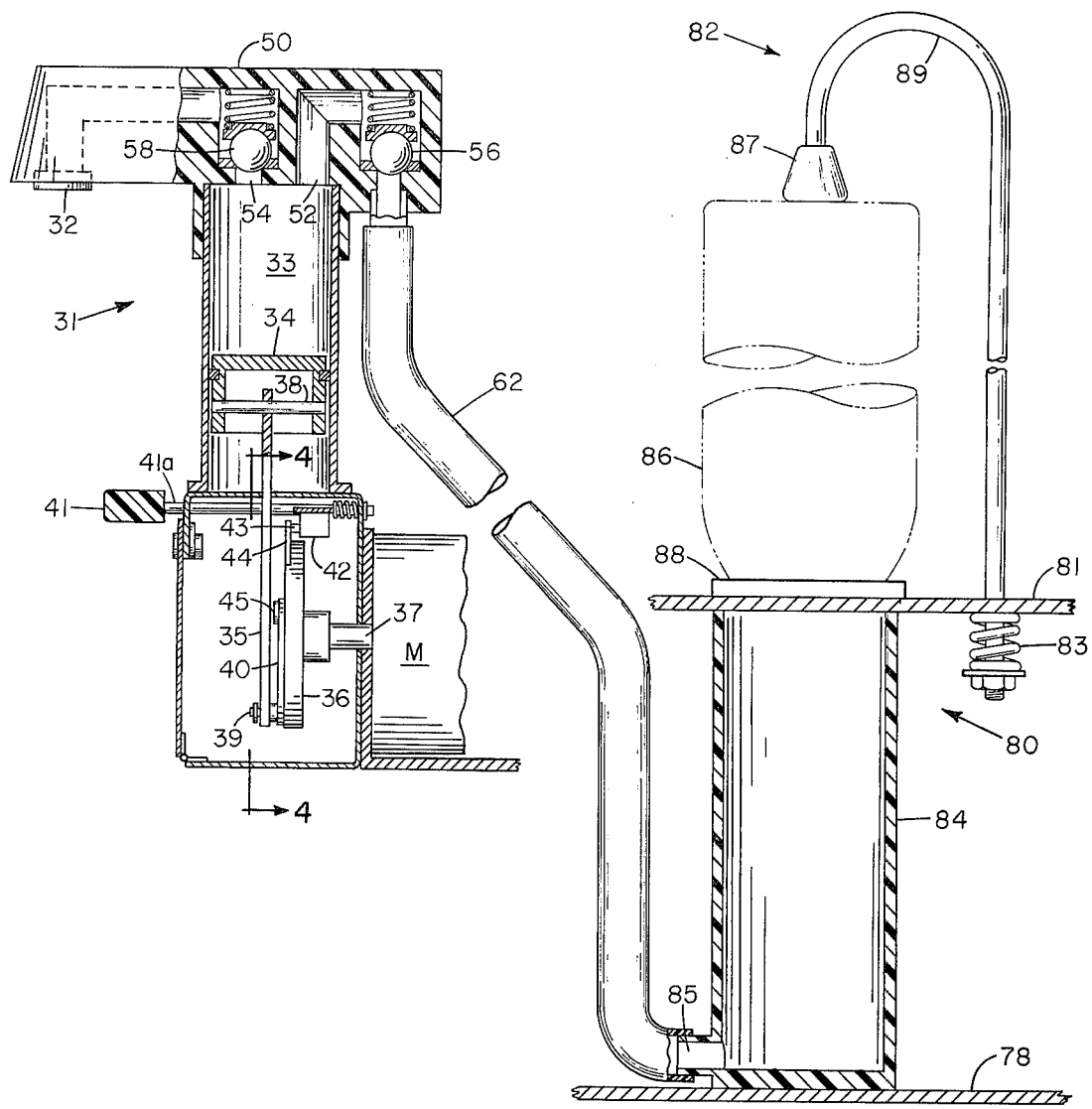
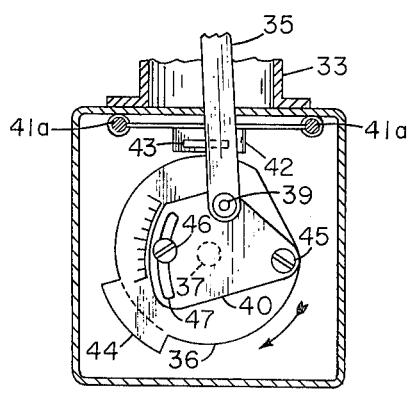
FIG. 3
FIG. 4

PORTABLE DISPENSING BAR

FIELD OF THE INVENTION

This invention relates to a portable bar and beverage dispensing system. More particularly, it relates to a selfcontained, portable bar having a plurality of electrically powered dispensing units for dispensing alcoholic beverages in accurate quantities and metering the number of drinks dispensed said bar being especially adaptable for use on railroad dining cars and passenger aircraft.

DESCRIPTION OF THE PRIOR ART

Portable bars and dispensing systems heretofore used for the purpose of dispensing alcoholic beverages have usually been quite bulky and, therefore, not suitable for use on aircraft and in railroad driving cars. Many of the portable dispensers have been designed for dispensing a very limited variety of drinks such as the dispenser disclosed in U.S. Pat. No. 1,979,549. Other types of portable dispensers, incorporating means for chilling and dispensing beverages from large containers are disclosed in U.S. pat. No. 3,327,902; U.S. Pat. No. 3,232,489 and U.S. Pat. No. 3,179,292. None of the aforementioned prior art devices are capable of dispensing an accurate controlled measure of several varieties of liquors from bulk storage containers and maintaining an accurate count of the number of drinks dispensed.

Passenger carriers such as airlines and railroads usually sell drinks to their passengers and the handling of the equipment and liquors presents numerous problems. Of particular concern is the loss of profits incurred by the airlines and railroads as a result of the present methods of operating bars. The liquor is usually packaged in small cocktail size miniature bottles which are dispensed by the stewardess to the customer. The only accounting for these sales is by comparision of the receipts against bottle inventory. This inventory can be influenced by addition to inventory from private supply rather than from the carrier's supply. Thus, it is very easy for an unscrupulous steward to substitute his own stock for that of the carrier. Furthermore, the cost of miniatures is much greater than bulk bottled liquors. Due to the space requirements, the miniatures are simpler to handle, however, many carriers are resorting to the use of bulk bottles in an attempt to overcome some of the aforementioned problems. This, of course, presents the problem of storage and handling which is quite acute particularly on aircraft and, furthermore, it does not completely eliminate the problems of profit loss and there is also the problem of inaccurate mixing thus effecting the quality of the drink. In either case, the problem of serving drinks through the aisle of the passenger compartment is time consuming and difficult. Various attempts have been made to overcome this problem such as the use of beverage carts which are pushed through the aisle of the passenger compartment. Such carts which are presently in use are not particularly desirable for this purpose due to the method of storing the bottles, glasses, ice and other equipment on the cart. Furthermore, the carts are unstable, particularly during flight.

SUMMARY OF THE INVENTION

A portable bar assembly having a unitary cabinet structure mounted on a plurality of casters contains a plurality of liquor dispensing units, each having a delivery nozzle and an electrically powered pump for delivering preset controlled quantities of liquor to the delivery nozzle from a bulk storage container. A surface storage area extends forward from the dispensing units and contains a utility pan positioned below the delivery nozzles for catching overflow and spillage from the nozzles. The surface storage area also hold receptacles for cherries, olives and the like positioned forwardly of the utility pan and an ice receptacle is positioned forwardly of the receptacles containing the olives and cherries. Projecting from the front of the portable bar and extending rearwardly underneath the ice receptacle is a plastic cup dispenser. Mounted underneath the cup dispenser is a refuse bin which swings forwardly from the front of the cabinet and which receives the water draining from the ice receptacle. A bulk bottle storage compartment is located underneath the dispensing units and utility pan and a sliding drawer assembly is slidably mounted in the storage compartment and slides from the rear of the cabinet and supports a plurality of liquid reservoirs for holding liquor bottles. Springloaded hold downs hold the bottles in inverted scaled position in the wells. The wells communicate via suitable conduits with the pump in the dispensing units. Also positioned on a shelf in the storage compartment above the sliding drawer is a battery and battery charger pack which supplies power through an electrical circuit to the electrically operated pumps in the dispensing units. The dispensing units are designed to operate off D-C current and the battery charger pack permits periodic recharging of the batteries from an A-C power source.

The preferred form of bulk container is a bottle of either the standard four-fifths quart, full quart or half gallon size as is normally used to bottle various liquors such as scotch, bourbon, gin and vodka. It will, of course, be understood that the invention is not limited to these specific containers.

The liquid reservoir and the dispensing unit is of the type described and claimed in U.S. Pat. No. 3,024,942 and U.S. Pat. No. 3,089,618; the details of which do not constitute a part of this invention.

A foot pedal actuated swivel lock assembly is located underneath the cabinet for locking the casters against rolling or swiveling.

The dispensing system is completely contained in a unitary cabinet structure mounted on swivel type casters for mobility and a foot pedal operated swivel lock is provided for locking the casters against movement.

BRIEF DESCRIPTION OF THE DRAWINGS

FIG. 3 is a vertical sectional view of a dispensing unit and reservoir assembly.

FIG. 4 is a view along lines 4—4 of FIG. 3.

DETAILED DESCRIPTION

Figure 1:
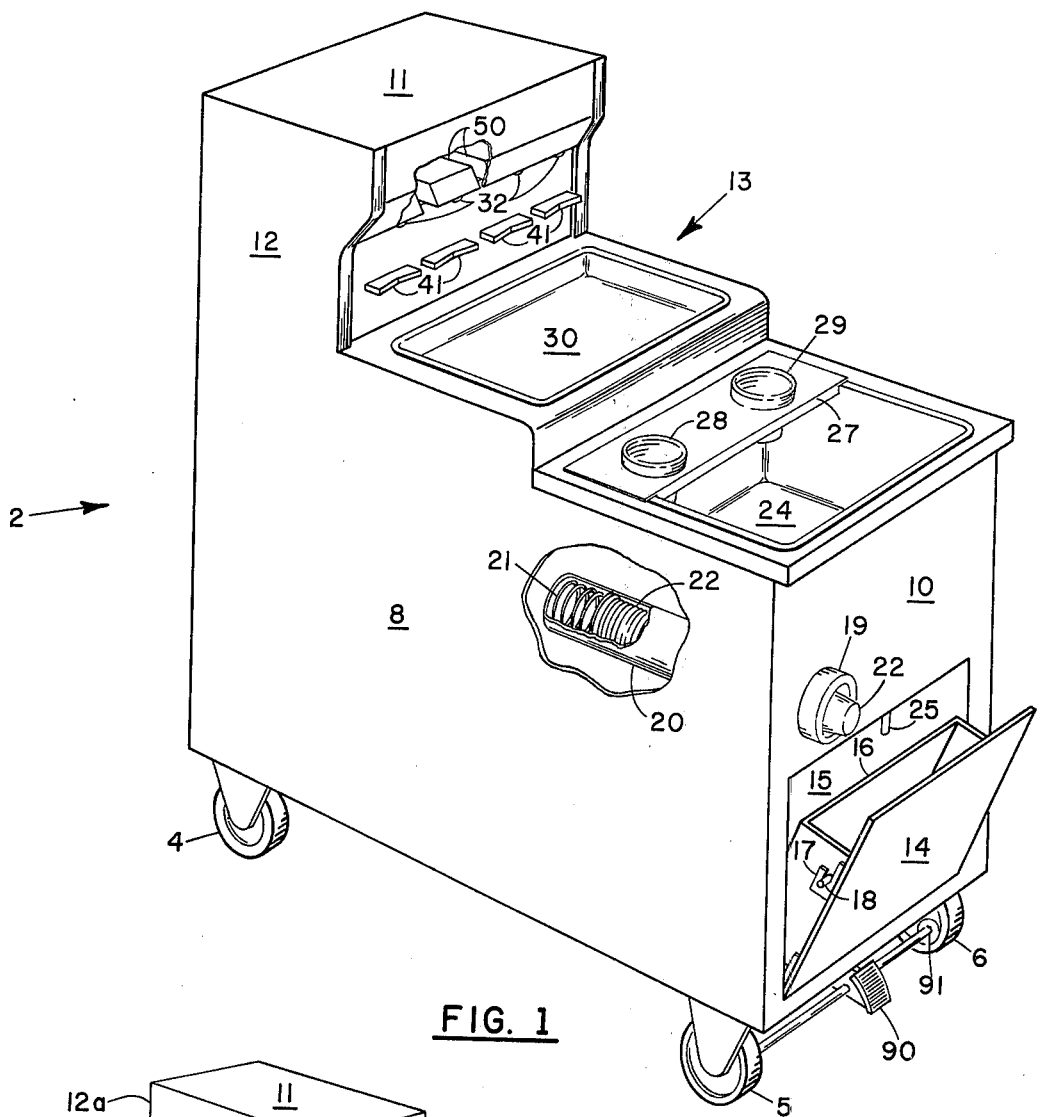
FIG. 1 is a perspective front and side view of the portable bar with a plurality of dispensing units.
Figure 2:
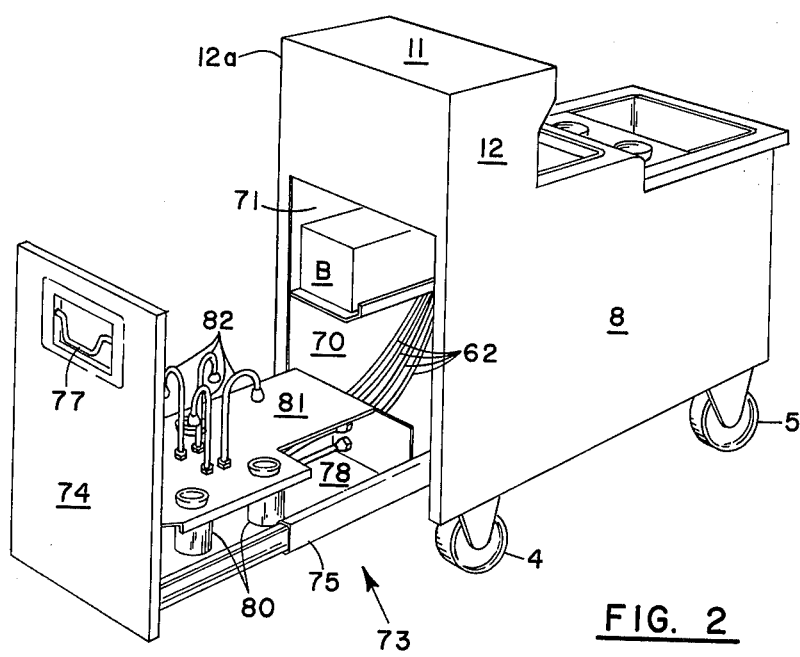
FIG. 2 is a perspective rear and side view of the portable bar with the bulk storage drawer extending from the cabinet.

A portable bar assembly 2 is mounted on four casters, three of which are shown and designated, 4, 5 and 6. The assembly consists of a unitary cabinet structure having parallel side walls 7 and 8, a back 9 and a front 10. Side walls 7 and 8 have an upward extension 12a and 12 respectively at the rear of the cabinet structure with a top wall 11 extending between the extension 12a and 12. A plurality of identical dispensing units 31 each having a dispensing nozzle 32 are mounted inside the cabinet structure between the extensions 12a and 12 underneath the top wall 11. Extending forward from the extensions 12 and 12a to the front 10, is an offset surface storage area 13 mounted between the side walls 7 and 8.

A receptacle 16 is removably mounted on a front panel 14 which is pivotally hinged in opening 15 in front wall 10. The panel 14 is rotated to the open position for gaining access to the receptacle 16 as shown in FIG. 1. The receptacle 16 serves as a trash receptacle as well as receptacle for receiving drainage from an ice sink 24 described hereinafter. The trash receptacle 16 is connected to the panel 14 by means of the brackets 17 and the pins 18 for easy removal of the receptacle for emptying. A glass dispenser 19 projects through front wall 10 from inside the cabinet structure above the receptacle 16 and is shown in FIG. 1 with glasses 22 projecting therefrom. The glass dispenser 19 is preferably of the spring loaded type and consists of a cylindrical housing 20 with a spring loaded follower 21.

Positioned on surface storage area 13 is an ice sink 24 with a drain tube 25 extending therefrom into receptacle 16. A utility tray 27 carries storage containers 28 and 29 and extends across and covers a portion of the top of the ice sink 24 and is removably mounted thereon. The storage containers 28 and 29 may be used for storing cherries, olives and the like. A utility pan 30 is mounted on surface storage area 13 underneath the dispensing nozzles 32 to catch spillage, drips and overflow from said nozzles.

A storage compartment 70 is located inside the cabinet assembly with access to the storage compartment being through an opening 71 in the back wall 9. A drawer assembly 73 extends into the storage compartment 70 and has a door panel 74 closing the opening 71. The drawer assembly 73 is mounted on a slide assembly 75. The door panel 74 is provided with a door pull 77. The drawer assembly has a bottom wall 78 supporting a plurality of reservoir assemblies 80. A plate member 81 is intergrally connected in the drawer assembly and the reservoir assemblies 80 extend through openings in the plate member 81 and are held in position thereby. Extending upwardly through the plate member 81 are a plurality of bottle hold downs 82, one for each of the reservoir assemblies. Each hold down consists of a rod 89 having a reverse bend with a resilient cap member 87 mounted on the end of the reverse bend portion for engaging the bottom of an inverted bottle 86. The hold down is spring loaded with a spring means 83 mounted underneath the plate 81.

A typical dispensing unit 31 and liquid reservoir unit 80 are shown in FIG. 3, it being understood that a plurality of such units are contained in the portable bar assembly of this invention and may be of the type described in detail in U.S. Pat. No. 3,089,618. The dispensing unit consists of a dispensing nozzle 32, a pump chamber 33, a pump piston 34 in said chamber with a piston rod 35 pivotably connected to the piston 34 at its one end by a wrist pin 38. The piston rod is pivotally connected to a crank plate 40 at its other end by means of crank pin 39. The crank plate 40 is pivotally held to a cam disc 36. The crank plate 40 has an arcuate slot 47, the radius of which is concentric with pin 45 and extending through said slot into crank plate 40 is a lock screw 46. Cam disc 36 is rotated by an electric motor M through a shaft 37. By swinging crank plate 40 the throw of crank pin 39 relative to shaft 37 can be varied, so controlling the stroke of piston 34 and thereby varying the quantity of liquid pumped at each stroke.

On top of the pump chamber 33 is a delivery head 50 containing an inlet 52 and an outlet 54 fitted with suitable non-return valves 56 and 58 respectively, so that the liquid can be pumped in only one direction. Outlet 54 leads to the dispensing nozzle 32 and the inlet 52 is connected to a supply line 62.

The motor M is powered by a plug-in type D-C battery pack B electrically connected to the motor M. The battery pack B is equipped with a charger mechanism for recharging the battery from a standard A-C power source. The battery pack is carried in the storage compartment 70 on a shelf 3 and is easily removed therefrom for recharging.

A spring loaded push bar 41 is connected by means of rods 41a to an actuated switch 42 which is operatively connected to the motor M. The switch 42 has a push button 43 which engages a radially extending cam lobe 44 on a portion of the periphery of the cam disc 36, the switch being normally off when the push button 43 is depressed by the lobe 44. When the push bar 41 is forced inward as by a drink glass being pressed against it, the push button 43 is released to start the motor M and thereby rotate the shaft 37 and cam disc 36. The lobe 44 is rotated out of contact with push button 43 thereby causing the cam to make one complete revolution before the lobe 44 again contacts the push button 43 to stop the motor M.

The details of a typical reservoir assembly 80 is shown in FIG. 3 and consists generally of a cylindrical tank 84 with an outlet 85 in the bottom thereof communicating with the supply line 62. The tank 84 can be supplied with liquid from a suitable container such as the inverted bottle 86 held in the retaining sleeve 88, indicated in broken line in FIG. 3. The bottle is held in position in the retaining sleeve 88 by means of the bottle hold down 82.

Positioned above the drawer assembly and extending outwardly from side wall 7 is the storage shelf 3 for supporting the portable battery pack B.

A foot pedal 90 extends from underneath the front wall 10 of the portable bar assembly. Foot pedal 90 is operatively connected to a swivel lock assembly 91 for locking the casters against movement.

Having now described a preferred embodiment of my invention what I claim is:

1. A portable bar assembly for serving mixed drinks consisting of a unitary cabinet structure mounted on a plurality of casters, said cabinet structure having a front wall, a back wall, parallel side walls having upward extensions toward the back of the cabinet, a top wall extending between the upward extensions and a plurality of liquid dispensing units mounted inside the cabinet structure between said upward extensions and underneath said top wall, said liquid dispensing units having measuring means for selectively dispensing a measured quantity of liquid for said mixed drink, said liquid being contained in reservoirs stored on a slidable tray connected to a portion of said back wall underneath said dispensing units, flexible tubing means connecting said reservoirs to said measuring means;

said unitary cabinet structure has an offset storage surface between said side walls and extending forwardly from said dispensing units;

said dispensing units including a liquid pump, a motor, a dispensing nozzle, a push bar operatively connected to a switch for energizing said motor, and a rechargeable battery pack located in said storage compartment for providing power to each of said motors.

2. The portable bar assembly of claim 1 wherein each of said liquid reservoirs is provided with a bottle retaining ring for holding an inverted bottle therein, each of said reservoirs having an outlet part in the bottom thereof connected to a liquid conduit communicating with a respective one of said dispensing units.

3. The portable bar assembly of claim 2 including a spring loaded bottle hold down adjacent each of said liquid reservoirs for engaging the bottom of an inverted bottle and applying pressure thereto to hold the bottle in position in said bottle retaining ring.

4. The portable bar assembly of claim 3 wherein a slide mounted drawer assembly is slidably mounted in said storage compartment for sliding movement from an opening in the rear wall of said cabinet structure, said drawer assembly having a door panel mounted thereon for closing said opening in said rear wall, and wherein said liquid reservoirs and said bottle hold downs are mounted on said drawer assembly.

5. The portable bar assembly of claim 4 wherein said cabinet structure has an opening in said front wall with a panel pivotally mounted therein, for closing said opening, said panel having means on its one side for removably connecting a refuse receptacle thereto for storage inside said cabinet structure.

6. The portable bar assembly of claim 5 wherein said offset storage area has a plurality of receptacles mounted thereon including an ice sink, said ice sink having a drain tube communicating with said refuse receptacle.

7. The portable bar assembly of claim 6 wherein said cabinet structure has a spring loaded glass dispenser mounted therein, said dispenser opening through said front wall.

8. The portable bar assembly of claim 7 wherein a foot pedal extends from underneath the said cabinet structure and is operatively connected to said casters for locking said casters against movement.

* * * * *